(12) United States Patent
Kempf

(10) Patent No.: US 7,200,980 B2
(45) Date of Patent: Apr. 10, 2007

(54) DRIVE SYSTEM OF A SELF-PROPELLED WORKING MACHINE

(75) Inventor: Bernd Kempf, Althornbach (DE)

(73) Assignee: Deere & Company, Moline, IL (US)

( * ) Notice: Subject to any disclaimer, the term of this patent is extended or adjusted under 35 U.S.C. 154(b) by 132 days.

(21) Appl. No.: 10/741,098

(22) Filed: Dec. 19, 2003

(65) Prior Publication Data

US 2004/0128966 A1      Jul. 8, 2004

(30) Foreign Application Priority Data

Dec. 21, 2002  (DE) ................................ 102 60 480

(51) Int. Cl.
 *A01D 69/08*   (2006.01)
(52) U.S. Cl. ....................................... 56/11.4; 56/11.8
(58) Field of Classification Search ................ 56/11.4, 56/11.5, 11.8, 10.9, 10.8
See application file for complete search history.

(56) References Cited

U.S. PATENT DOCUMENTS

| 4,414,863 | A | * | 11/1983 | Heino | ............................ | 477/63 |
| 6,047,230 | A | * | 4/2000 | Spencer et al. | ................ | 701/57 |
| 6,217,477 | B1 | * | 4/2001 | Nobumoto et al. | ............ | 477/43 |
| 6,319,171 | B1 | * | 11/2001 | Hughes et al. | ............... | 477/111 |
| 6,363,805 | B1 | * | 4/2002 | Marchart | ...................... | 74/335 |
| 6,543,593 | B2 | * | 4/2003 | Saito | ......................... | 192/48.4 |

FOREIGN PATENT DOCUMENTS

| EP | 0819562 | 1/1998 |
| EP | 1052388 | 11/2000 |

\* cited by examiner

*Primary Examiner*—Meredith C. Petravick

(57) ABSTRACT

A self-propelled forage harvester includes front and rear sets of driven ground wheels. The front set of wheels is driven through a transmission including an input shaft driven by a variable displacement motor and coupled to the front set of wheels by a gear train including one planetary gear set, (in one embodiment), and two planetary gear sets, (in a second embodiment). In both cases, the transmission is shiftable so as to establish at least first and second gear ratios. The shifting of the transmission is accomplished automatically by a control arrangement which takes into account the operating mode of the harvester so that a ratio for producing the correct velocity range for harvesting is established when the harvester is in a working operating mode, and a higher velocity range is established when the harvester is in a transport operating mode. Other operating parameters are sensed and used to automatically control hydraulic pump and/or motor displacement, and for controlling engine speed.

21 Claims, 3 Drawing Sheets

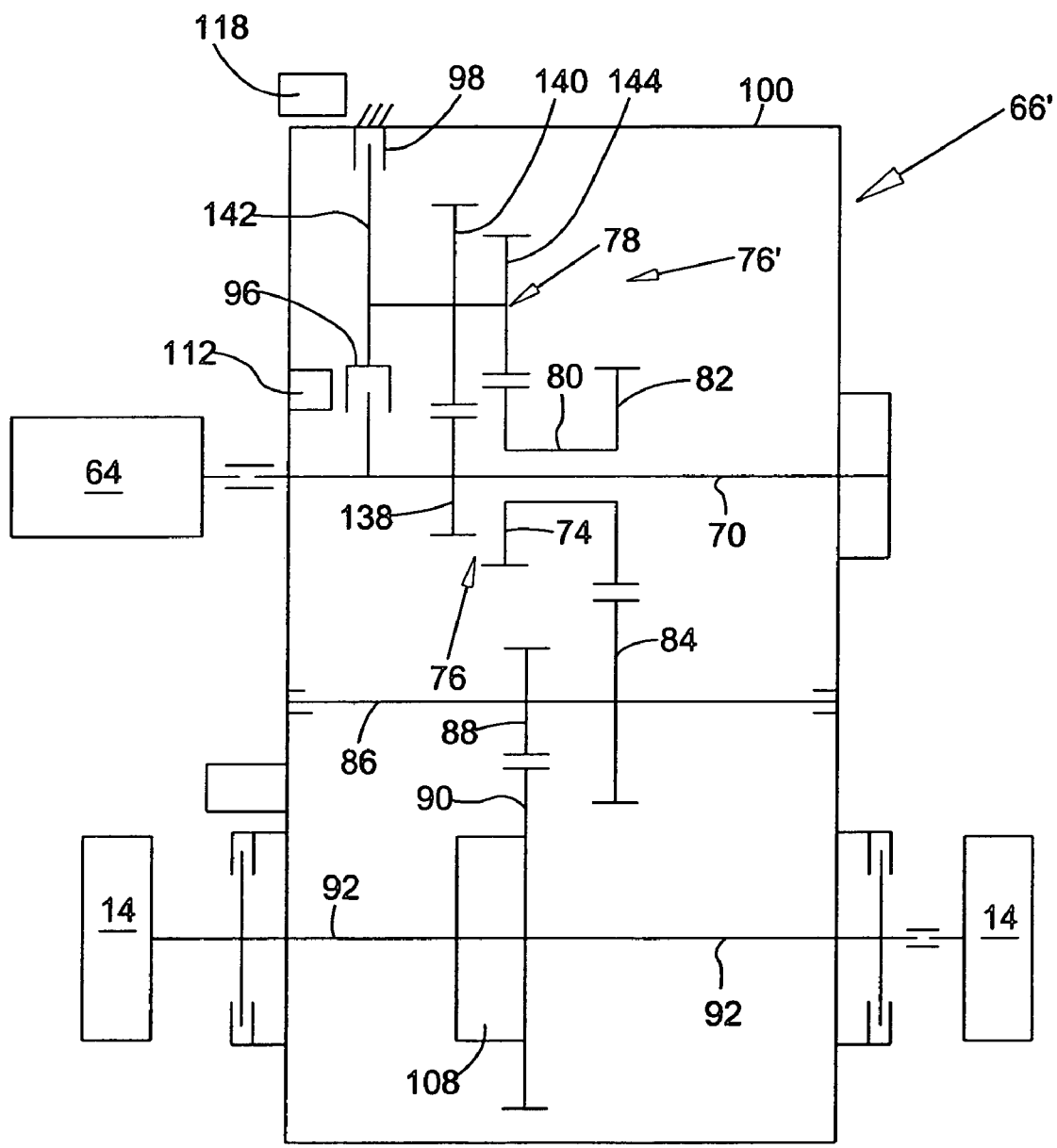

DRIVE SYSTEM OF A SELF-PROPELLED WORKING MACHINE

FIELD OF THE INVENTION

The invention concerns the drive system of a self-propelled working machine, with an internal combustion engine that can be operated to drive elements in contact with the ground for the forward propulsion of the working machine over a transmission with at least two selectable gear ratios, where a control arrangement is connected with an actuator that is arranged to select the gear ratios of the transmission.

BACKGROUND OF THE INVENTION

As a rule, self-propelled working machines, particularly harvesting machines, are driven hydrostatically. Normally a transmission that can be shifted through a number of gear ratios is inserted between the axle drive and the hydraulic motor. In the state of the art, these transmissions are shifted manually. In the working or harvesting operation, as a rule, only a few of the available gear ratios are required (the first and/or second gear), While during the transport of the working machine or operating on public roads, the normal operation is faster so that the other gear ratios are needed. A particular disadvantage lies in the fact that shifted transmissions for harvesting machines require that the machine be brought to a complete stop before a gear shift can be performed. With normal motor vehicles operating on roads, synchronized transmissions are used in order to have the speed of one transmission shaft conform to the speed of another, so as to perform smooth gear shifts. In harvesting machines, the synchronization is not used for conformity of velocity, but for the conformity of the position or the phase in order to provide the assurance that the gear teeth that are to be brought into mesh are properly aligned with each other. Much time is lost by the stopping and restarting, and thereby dangerous situations can develop, particularly in traffic on the road, in case a gear shift becomes necessary.

EP 0 819 562 A proposes an electronic control arrangement that automatically brings the harvesting machine to a standstill after a gear change input of an operator and then shifts the gears. While a shift lever may be saved and the operator relieved of the task of shifting, it is nevertheless necessary to bring the machine to a standstill before the shifting process, which has the aforementioned disadvantages.

EP 1 052 388 A proposes a harvesting machine in which the rotational speed of the drive engine is controlled as a function of an automatically recognized operating mode. During harvesting, the operation is performed at a fixed rotational speed, while during transport operations or operation on public roads, the rotational speed of the engine is a function of the immediate velocity. Here, too, the immediate gear ratio is selected manually.

The problem underlying the invention is seen in the need to make available an improved drive system for a self-propelled working machine.

SUMMARY OF THE INVENTION

According to the present invention, there is provided an improved propulsion drive transmission for a self-propelled working machine.

An object of the invention is to provide a propulsion drive transmission having at least two selectable gear ratios and for these ratios to be automatically selected.

The foregoing object is achieved in a machine having the following structure. Specifically, in a self-propelled working machine an internal combustion engine drives the elements that engage the ground over a transmission with selectable gear ratios that are used for the forward propulsion of the working machine and which usually are wheels or track-laying chains. The gear ratio of the transmission can be selected by an actuator that is controlled by a control arrangement. It is proposed that the control arrangement automatically selects the gear ratio of the transmission, that is, independently of any gear ratio selection input from an operator.

In this way, a manual actuation of a shift control lever and a manual input of the gear ratio is omitted, which considerably simplifies the operation of the working machine for the operator. The corresponding operating elements in the operator's cab can be omitted so that the former can be configured for easier operation and the manufacturing cost can be reduced.

Preferably, the control arrangement is supplied with information regarding the operating mode in which the working machine is operating at that particular time. On the basis of this information, the control arrangement can select the appropriate gear ratio of the transmission.

The operating mode can be recognized on the basis of an operating mode selector arrangement that can be actuated by the operator manually or by a foot switch or acoustically or by any desired other manner. The control arrangement is supplied with information about the operating mode selected by the operator by means of the operating mode selection arrangement. In the case of a harvesting machine, the operating mode selector arrangement may be a field/road selector switch, known in itself, with which the harvesting machine can be switched between a harvesting operating mode and a road operating mode. Alternatively, or in addition, it would be conceivable that the operating mode be recognized on the basis of the condition of an element of the working machine. If this element is in its working position, for example, a cutter head lowered into its harvesting position, it can be recognized that the working machine is in a working operating mode. With respect to an automatic recognition of the operating mode, reference is made in addition to the disclosure of EP 1 052 388 A, whose disclosure is incorporated into the present supporting documents by reference.

In a preferred embodiment, the gear ratio is selected by the control arrangement as a function of whether the working machine is in a working operating mode or in a road or transport operating mode. During the working operation (for example during harvesting), the greater part of the power made available by the internal combustion engine is required, as a rule, for the working operation, so that the forward propulsion is performed only at reduced speed compared to the transport operation. An obvious solution, therefore, is to make available fewer gear ratio steps during the working operation than for the operation on roads. During reverse operation, a smaller region of operating speeds, and therefore fewer gear ratios of the transmission are required, so that it is useful to select the gear ratios on the basis of the direction of the operation as well. As a rule, it is sufficient to make available only a single fixed gear ratio during the working operation or during reverse operation. The control arrangement then automatically selects this gear ratio when the working machine is in the working operating mode or in reverse operation. On the other hand, during the transport operation or transport on the road, the control arrangement can select among several (as a rule, all) available gear ratios.

Self-propelled working machines, particularly harvesting machines, are usually driven hydraulically. The internal combustion engine drives a hydraulic pump that pressurizes a hydraulic fluid, that in turn, drives a hydraulic motor. The latter drives the elements used for the forward propulsion over the aforementioned transmission of the working machine with a gear ratio automatically selected by the control arrangement. Such hydraulic drives are distinguished by elasticity and reliability.

In such working vehicles, the hydraulic pump and or hydraulic motor, as a rule, are equipped with an adjustable swash plate in order to reposition the displacement and thereby the rotational speed of the hydraulic motor and the forward propulsion velocity. While it would be conceivable to perform the repositioning of the hydraulic pump and/or the hydraulic motor swash plates manually, it is particularly advantageous that the control arrangement also reposition the swash plate(s) of the hydraulic pump and/or the hydraulic motor. Then the control arrangement can control not only the gear ratio of the transmission, but also the forward propulsion velocity of the working vehicle, for example, automatically or on the basis of an input from the operator or regulate on the basis of a forward propulsion signal of a sensor. In order to minimize the number of gear ratios of the transmission, an embodiment is preferred in which the control arrangement controls the hydraulic pump as well as the hydraulic motor, since this combination makes possible a relatively wide range of speeds without any additional transmission gear ratios. In this way, one or more transmission gear ratios could be omitted.

In a preferred embodiment, the control arrangement is arranged to select the gear ratio of the transmission on the basis of operating data of the hydraulic pump and/or the hydraulic motor. Thereby, the gear ratio can be selected by the control arrangement automatically in such a way that the allowable limit data of the hydraulic pump and the hydraulic motor are maintained. In actual fact, the transmission may be a function of the pressure in the hydraulic system. If the pressure exceeds a fixed threshold value, the control arrangement can select the next smaller gear ratio in which a lower pressure exists in the hydraulic system. Alternatively or in addition, the gear ratio selected by the control arrangement may be a function of the forward propulsion velocity. If this exceeds a certain limit value, the control arrangement selects the next higher gear ratio in each case.

Furthermore, it is proposed that the control arrangement can also provide rotational speed of the main drive engine as an input. Thereby, a higher rotational speed can be applied as a target value in the working operation, in which a higher power level (and hence a higher rotational speed) is required than in a transport or road operation, in which a lower rotational speed is sufficient and in which the internal combustion engine operates more frugally and with lower noise output. Thereby, in the working operation, a lower, fixed rotational speed for the internal combustion engine is provided as an input. Alternatively, the operator may select a rotational speed where the entire rotational speed range of the internal combustion engine or a particularly useful partial region of it, is available. In operation over public roads or in a transport operation, on the other hand, an obvious solution is to provide a fixed rotational speed as an input for the internal combustion engine (that is lower, as a rule, than in the working operation) or to control it as a function of the immediate load on the internal combustion engine. A control of the rotational speed of the internal combustion engine, as a function of the load, may also be useful during the working operation.

In the over-the-road or transport operating mode, the forward propulsion velocity of the working machine can be provided as an input, as a rule, by an operator by means of an operating element. For this purpose, a manually controlled operating lever and/or a pedal may be available to the operator. During the working operation, the forward propulsion velocity of the working machine can also be proved as an input by the operator by means of the operating element. An obvious solution is to provide at the operator in both operating modes with the operating element in the available region of movement. In the over-the-road transport operating mode, the range of velocities that can be attained is larger than in the working operating mode in which a rather sensitive velocity input is possible. In addition or alternatively, there is the possibility of the controlling of the forward propulsion velocity of the working machine in the working operating mode as a function of its load.

The invention is particularly appropriate for harvesting machines. An obvious solution is to automatically deactivate the working arrangements, that is, in particular, the crop conveying and/or the crop processing arrangements in the over-the-road or transport operating mode. In the working (harvesting) operating mode, on the other hand, all arrangements are preferably deactivated that are required only during operations on the road, such as, for example, the road traffic illumination.

The drive system described so far could be applied to transmissions that require the working machine to be brought to a standstill before a change in the gear ration of the transmission is performed. In order to make possible an automatic shifting of the gear ratio, a control arrangement could be used that automatically brings the machine to a standstill before the actual gear shifting process, and then permits it to drive off. Due to the disadvantages associated with this process, however, a simpler and more advantageous solution is preferred. As an alternative, or in addition to the aforementioned object, it is therefore proposed that the gear ratio of the transmission be changed while the working machine is operating. Thereby, the stopping of the working machine before the change in gear ratio could be omitted.

An appropriate transmission could be a transmission known in itself from automobiles that is equipped with synchronizing arrangements. However, due to the relatively high torques that must be transmitted by working machines, such transmissions are expensive. For the present application, a transmission is preferred that includes a planetary transmission. The planetary transmission includes a sun gear and a planet carrier. There is the possibility of blocking the planetary transmission in itself at a gear ratio, while the planets mesh with and roll on the sun gear in the other gear ratio.

These possible transmissions can be attained in various ways. In one embodiment, the planet carrier is coupled in on gear ratio with the output shaft or the input shaft. If the planets mesh with the planets of another planetary transmission that is connected so as to transmit torque over another gear with the output or input shaft, the planetary transmission is locked in itself. The result is a transmission gear ration of 1:1. On the other hand, if the planet carrier is arrested, the torque is transmitted over the gear, the planet sets, and the sun gear (or the inverse), so that a gear reduction ratio or step-up ratio can be attained.

In another embodiment, the planetary transmission includes a ring gear, a planet and a sun gear. One of these elements is used as the drive and another as the output. The third element is driven at different rotational speeds, as function of the gear ratio selected, particularly in that it is connected so as to drive one of the other elements or is stopped. In a preferred embodiment, the ring gear is coupled with the sun gear in a first gear ratio and is held in a stationary position in a second gear ratio. Here, the planet carrier may be used as an input or an output, while the sun gear is used correspondingly an output or an input. The advantage of this solution lies in the fact that only one clutch that can be disengaged is required between the third element (here the ring gear) and one of the other elements (here the sun gear), and a brake is required for the third element.

In the embodiments of the planetary transmission described, synchronization can be omitted, since all gears are constantly in mesh.

Finally, it should be noted that in place of the internal combustion engine described above, a fuel cell could also be used where an electric motor connected to it electrically provides the drive power. Such arrangements are also intended to fall under the protection of the claims of this application.

BRIEF DESCRIPTION OF THE DRAWINGS

The drawings show an embodiment of the invention that shall be described in greater detail in the following.

FIG. 3 is a schematic representation of an alternative embodiment of the transmission of FIG. 2.

DESCRIPTION OF THE PREFERRED EMBODIMENT

Figure 1:
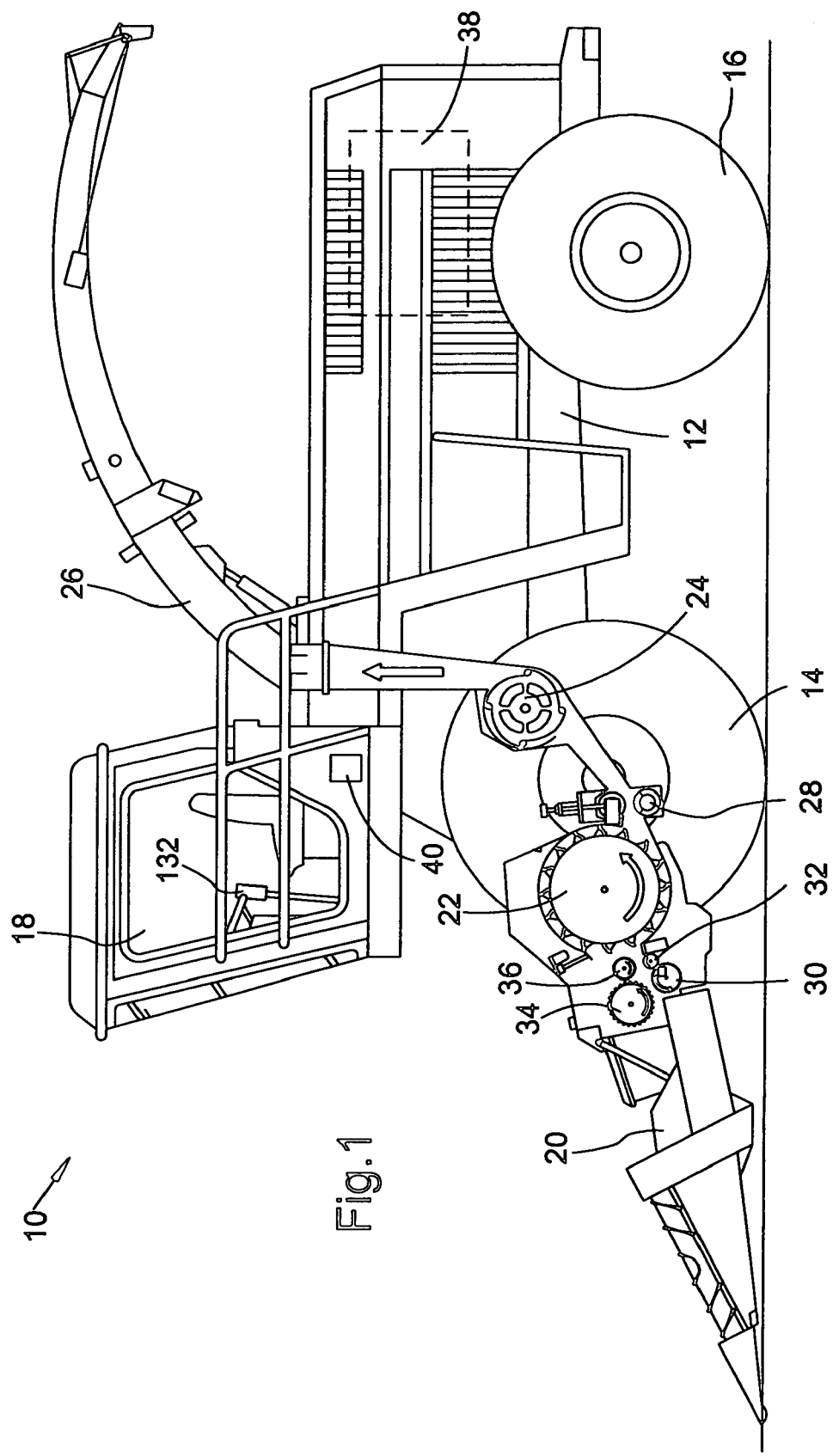
FIG. 1 shows a schematic side view of a self-propelled working machine.

Referring now to FIG. 1, there is shown a self-propelled working machine 10 in the form of a self-propelled forage harvester supported on a frame 12 that is carried on front wheels 14 and rear, steerable wheels 16. The working machine 10 is controlled from an operator's cab 18 from which a harvested crop take-up arrangement 20 can be viewed by the operator. Crop, for example, corn, grass or the like, taken up from the ground by means of the crop take-up arrangement 20 is conducted by four intake rolls 30, 32, 34, 36 to a chopper drum 22, that chops the crop into small pieces and delivers it to a conveying arrangement 24. The crop leaves the working machine 10 over a rotating discharge duct 26 to an accompanying trailer. Between the chopper drum 22 and the conveying arrangement 24, a post-chopper reduction arrangement including two interacting rolls 28 is arranged by means of which the conveyed crop is conducted tangentially to the conveying arrangement 24.

The drive power required for the forward propulsion and for the operation of the working machine 100 is made available by an internal combustion engine 38, which is usually a diesel engine. An electronic control arrangement 40 is arranged in the operator's cab 18.

Figure 2:
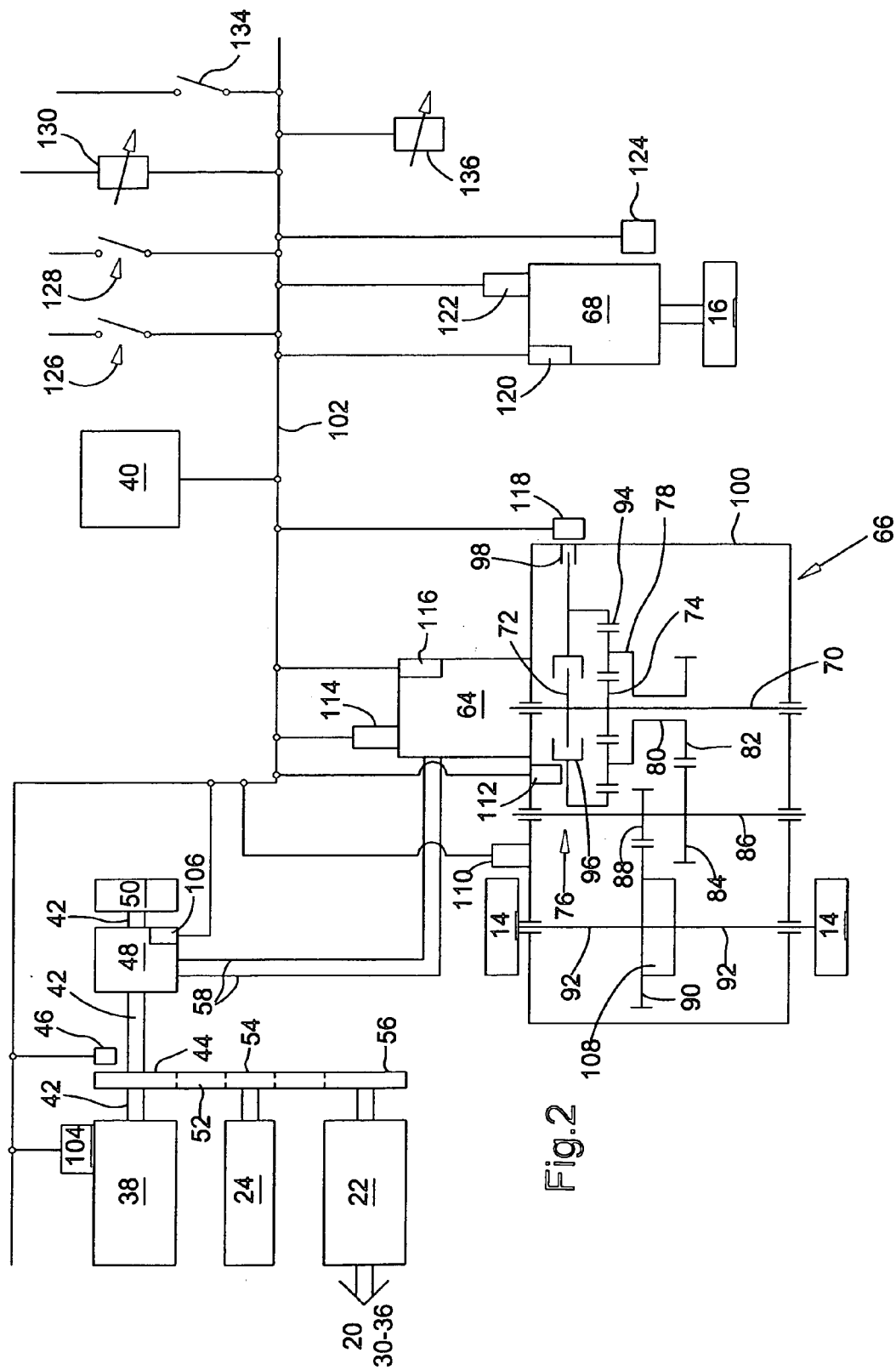
FIG. 2 is a schematic representation of the drive system for the working machine of FIG. 1.

FIG. 2 shows a schematic representation of the drive system of the working machine 10. The internal combustion engine 38 drives a shaft 42, on which a clutch 44 is arranged, that can be engaged and disengaged by an electromagnet 46. Furthermore, the shaft 42 drives a hydraulic pump 48 and a supply pump 50 that is used to supply the hydraulic systems of the working machine 10 except for the hydraulic motors used for the forward propulsion drive. The clutch 44 is arranged within a belt pulley about which a drive belt 52 circulates that also circulates about a first belt pulley 54 and a second belt pulley 56. The first belt pulley 54 is connected to drive the conveying arrangement 24, while the second belt pulley 56 is connected to drive the chopper drum 22. The power to drive the harvested crop take-up arrangement 20 and the intake rolls 30, 32, 34, and 36 is taken from the chopper drum 22. A part of the drive power or all of it for the intake rolls 30, 32, 34, and 36 can also be made available by an additional hydraulic motor that is driven by the supply pump 50 or another hydraulic pump that is connected so as to be driven by the internal combustion engine 38 and that drives the intake rolls over a planetary transmission that is driven, in addition, from the chopper drum 22, as was described by DE 198 12 500 A. In this way, the length of cut can be provided as a continuous input. But it would also be conceivable to use a transmission that could be shifted in steps for the intake rolls.

The hydraulic pump 48 is connected by hydraulic lines 58 with a hydraulic motor 64. The hydraulic motor 64 is connected over a transmission 66 so as to drive the front wheels 14. Between the transmission 66 and the front wheels 14, a differential gearbox 108, and in each case, a drive shaft 92 are arranged which drive the wheels 14 over axle end drives (not shown). An embodiment would also be conceivable in which each front wheel is associated with a hydraulic motor 64.

A second hydraulic motor 68 is also connected with the hydraulic pump 48 over lines carrying hydraulic fluid (not shown for the sake of clarity). The second hydraulic motor 68 is connected so as to drive the rear wheels 16, where a differential gearbox may also be provided or a hydraulic motor 68 is associated with each rear wheel 16.

The transmission 66 includes an input shaft 70 that is driven directly by the hydraulic motor 64 and that carries a cylindrical clutch disk 72. Furthermore, a sun gear 74 of a planetary transmission 76 is fastened to the input shaft 70. A planet carrier 78 of the planetary transmission 76 is connected to a gear 82 over a hollow shaft 80, that is arranged coaxially to the input shaft 70 and is supported in bearings on it, free to rotate, and the planet carrier 78 is coupled over a further gear 84 to an intermediate shaft 86, so as to carry or transfer torque. The intermediate shaft 86 drives a gear 88 that meshes with a gear 90, which drives a differential gearbox 108, which drives two output shafts 92. Each of the output shafts 92 is connected so as to drive one of the front wheels 14.

The ring gear 94 of the planetary transmission 76 can be brought into engagement and out of engagement with the clutch disk 72 by a clutch that can be actuated. Furthermore, a brake arrangement 98 is arranged between the housing 100 of the transmission 66 and the ring gear 94, with which the ring gear 94 can be held in a stationary position.

If the brake 98 is disengaged, the ring gear 94 is stopped. Then the hydraulic motor 64 drives the sun gear 74 over the input shaft 70, whereby the planetary transmission 76 produces a gear reduction ratio. The output drive is performed over the planet carrier 78, the hollow shaft 80, the gear pair 82, 84, the intermediate shaft 86, the gear pair 88, 90, and the output shaft 92, and the axle end drive to the front wheel 14.

If the brake 98 is released and the clutch 96 is engaged, the ring gear 94 is driven over the input shaft 70 by the hydraulic motor 64 at the same rotational speed with which the sun gear 74 is also driven. Therefore, the speed difference between the ring gear 94 and the sun gear 74 is less than in the operating mode described above, in which the ring gear 94 is held in a stationary position and the planetary transmission 76 is blocked in itself. The result is a gear ration of 1:1. Otherwise, the output drive is performed as described in the previous paragraph.

In this way, the result is that with the clutch 96 disengaged and the brake 98 applied, a first gear ratio is obtained; and with the clutch 96 engaged and the brake 98 released, a second gear ratio is obtained that provides a higher gear ratio, and thereby a higher forward propulsion velocity with a given rotational speed of the hydraulic motor 64, than the first gear ratio. The shift process can also be performed when the working machine 10 is operating, since the gears of the planetary transmission 76 are in mesh at all times and no synchronization is required. Any stopping of the working machine 10 for the performance of a shift process can be omitted.

The control arrangement 40 controls the elements of the drive system that can be controlled and is connected to a series of sensors. For this purpose, a bus 102 is provided, which as a rule can be either an LBS or a CAN bus, with which the control arrangement 40 is connected over a microprocessor or any other appropriate control circuit. The elements that can be controlled and the sensors are also equipped for data transmission over the bus 102 with microprocessors or other appropriate control circuits. Any other desired sensors or actuators can also be connected to the bus 102. Furthermore, several or all of the sensors and/or actuators can be connected directly to the control arrangement 40 or connected over a communications unit with the bus 102.

The bus 102 is connected with an electronic control unit 104 of the internal combustion engine 38. Furthermore, the bus 102 is connected with the electromagnet 46 for engaging and disengaging the clutch 44 for the drive of the chopper drum 22 and the conveying arrangement 24 and with an electromagnetic actuator 106 that is arranged for the repositioning of the swash plate of the hydraulic pump 48. The actuator 106 makes it possible to change the flow rate made available by the hydraulic pump continuously or in steps. Furthermore, it makes it possible to reverse the direction of flow of the hydraulic fluid so that the hydraulic motor 64 can be changed from forward to reverse operation. A rotational speed sensor 110 that detects the rotational speed of the output shaft 92 of the transmission 66, for example, optically or magnetically, is connected with the bus 102 as is an electromagnetic actuator 112 that is arranged for the engagement and disengagement of the clutch 96. A pressure sensor 114 connected by a flange to the hydraulic motor 64 detects the pressure of the hydraulic fluid existing at the hydraulic motor 64 and is connected with the bus 102, as is an electromagnetic actuator 116 that is arranged to reposition the swash plate of the hydraulic motor 64. The actuator 116 makes it possible to change the inflow flow rate of the hydraulic motor 64 and thereby reposition the rotational speed of the input shaft 70 at a given flow rate of the hydraulic fluid. Another electromagnetic actuator 118 is used to apply and release the brake 98 and is connected with the bus 102. The second hydraulic motor 68 is also equipped with an electromagnetic actuator 120 that repositions the swash plate of the second hydraulic motor 68 and is connected with the bus. The second hydraulic motor 68 is equipped with a pressure sensor 122 to detect the pressure existing at the second hydraulic motor 68 and with a rotational speed sensor 124 to detect the output rotational speed of the second hydraulic motor 68, each of which is connected with the bus 102. In place of the aforementioned electromagnetic actuators 46, 106, 108, 112, 116, 118, and/or 120, hydraulically controlled actuators could also be used that are controlled electromagnetically over appropriate valves.

Finally, the bus 102 is also connected with a first switch 126, a second switch 128, a third switch 134, and a potentiometer 130 as well as an operating element 136 that can also be configured in the form of a potentiometer, which are arranged in the operator's cab 18 within comfortable reach of the operator. The first switch 126 is used to switch between the working or harvesting mode and a road or transport mode. The second switch 128 is used to engage or disengage the all-wheel drive. The potentiometer 130 is used to detect the position of an operating lever 132 that can be pivoted and/or slid that is used to provide input for the forward propulsion velocity. The third switch 134 is used to turn the operating arrangements on and off by means of the clutch 44. The operating element 136 is used to provide the input for the rotational speed of the internal combustion engine 38.

The method of operation of the working machine 10 and the drive system described is as follows:

The control arrangement 40 tests regularly, for example, every ten milliseconds, whether the first switch 126 is in the position associated with the road or transport operation. It would also be conceivable, that in place of the position of the first switch 126 to detect the operating position or mode of a working element of the working machine 10, for example, a sensor tests whether the crop take-up arrangement is raised (non-operating position) or lowered (operating position).

If the first switch 126 is not in the road or transport operating mode position, the working machine 10 is therefore in the working (harvesting) operating mode; then the clutch 96 of the planetary transmission 76 is disengaged by the actuator 112, and shortly thereafter, the brake 98 is applied by the actuator 118. Thereby, the first gear ratio of the transmission 66 is selected permanently, since the forward propulsion velocity range made available by it is sufficient for the harvesting operation. The internal combustion engine 38 is brought to a rotational speed appropriate for the working operation by the control arrangement 40 over the electronic control unit 104 that may be provided as a fixed input or may be changed by the operator by means of the operating element 136. In the working operating mode, the control arrangement 40 makes it possible for the operator to engage the clutch 44 over the third switch 134 and the electromagnet 46, so that the working operating arrangements (conveying arrangement 24, chopper drum 22, intake rolls 30–36, and crop take-up arrangement 20) can be put into operation.

In the working operating mode, the control arrangement 40 controls the actuators 106, 116, and 120 of the hydraulic pump 48 and the hydraulic motors 64, 68 corresponding to a target velocity provided as an input by the operating lever 132, that can be provided as an input by the operator. The operating lever 132 can be pivoted forward for forward operation and to the rear for operation in reverse. On the basis of the potentiometer 130, actuators 106, 116, and 120 are controlled by the control arrangement 40. If the operating lever 132 is in a reverse operating position, then the control arrangement 40 switches the hydraulic pump 48 into a reverse position over the actuator 106. During the reverse operation, any actuation of the third switch 134 is ignored so that the working arrangements are automatically switched into a non-operating mode. In both directions of operation, the range of movement of the operating lever 132 corresponds to the entire velocity range available in the working operating mode. There are no end regions of the operating range of the operating lever 132 that can effect a change in the velocity, and a sensitive adjustment of the velocity is possible. The signals of the pressure sensors 114, 122 and the velocity sensors 110, 124 are considered by the control arrangement 40 during the adjustment of the actuators 106, 116, and 120, and are used to attain the desired forward propulsion velocity of the working machine 10, yet to avoid a spinning of the wheels 14, 16 or backward rotation during all external operating conditions. In this connection, reference is made to the disclosure of DE 102 11 779 A which is incorporated by reference into the present supporting documents.

It should be noted that it is also conceivable during the working operation to detect the crop throughput by any desired sensor, for example, by the position of the intake roll 36 that can move upward against the force of a spring, and to use it in place of the signal from the potentiometer 130 for the control of the forward propulsion velocity.

If the second switch 128 is in the non-all-wheel operating position, then the control arrangement 40 arranges for a further valve (not shown) to separate the second hydraulic motor 68 from the hydraulic lines 62 so that it revolves freely with the wheels 16.

If on the other hand, the control arrangement 40 finds that the first switch 126 is in the road or transport operating position, the control arrangement 40 ignores the third switch 134 or brings it automatically by means of a further actuator into the position that corresponds to a disengaged clutch 46. Thereby, in road or transport operation, no activation of the working arrangement is possible.

Thereafter, the control arrangement 40 tests whether the potentiometer 130 is in a position that corresponds to reverse operation. If that is the case, the actuator 106 is brought into a position for reverse operation and the clutch 96 is or remains disengaged, and shortly thereafter, the brake 98 is applied so that the transmission 66 remains in the first gear ration position or reaches that position. The reverse operating velocity range that can be provided by the operating lever 132 corresponds to the entire range of movement corresponding to the reverse operation in which the operating lever 132, as a rule, is moved to the rear. The control arrangement 40 controls the actuators 106, 116, and 120 considering the signals of the sensors 110, 114, 122, and 124 and the potentiometer 130, as described above. The second hydraulic motor 68 can be activated or deactivated by the second switch 128.

However, if the operating lever 132 is in a position that corresponds to a forward operation and the first switch is in the position corresponding to the road or transport operating mode, then the control arrangement 40 detects the actual forward propulsion velocity of the working vehicle on the basis of the signals of the velocity sensors 110, 124. If it lies below a predetermined threshold value, the clutch 96 is or remains disengaged or deactivated with the use of the actuators 112, 118, and shortly thereafter, the brake 98 is applied or activated. The transmission 66 is thereby placed in the first gear ration condition. If the actual velocity, however, is below the predetermined threshold value and the pressure sensor 114 signals an allowable pressure, the brake 98 is released or deactivated and the clutch 96 is engaged by the particular actuators 112, 118 so that the second gear ration of the transmission 66 is selected. Thereby, the full velocity range is available from the transmission 66 in the road or transport operating mode. The forward velocity range that can be provided as an input by the operating lever 132 corresponds to its entire operating range in the forward operating direction, in which the operating lever 132, as a rule, is moved forward. While no such sensitive adjustment is possible in the working and reverse operating range, however, a selection of all available forward and reverse operating velocities is available. In the road or transport operating mode, the forward propulsion velocity and/or the reverse operating velocity of the working machine 10 could also be provided as an input by a pedal.

The control arrangement can perform a comparison between the immediate operating velocity that is detected by the velocity sensors 110, 124 and an allowable maximum operating velocity. When the maximum velocity is reached or exceeded, inputs for any increase in the velocity are ignored or the velocity is automatically reduced. With respect to this, reference is made to the disclosure of DE 101 09 775 A which is incorporated by reference into the present supporting documents.

With both gear ratio steps of the transmission 66, the control arrangement 40 considers the signals from the velocity sensors 110, 124 and the pressure sensors 114, 122 in the road or transport operating mode in forward and reverse operation, in order to attain the desired forward propulsion velocity, but to prevent a spinning or backward rotation of the wheels 14, 16, as was explained above on the basis of the working operation. Furthermore, the control arrangement 40 provides for an automatic transition from the second into the first gear ration, in which the clutch 96 is disengaged, and preferably shortly thereafter, the brake 98 is applied, as soon as the forward propulsion velocity measured by the velocity sensors 110, 124 falls below the aforementioned threshold value or the pressure sensor 114 detects an excessively high value. The threshold value for a downshift may also be somewhat lower than the threshold value for an upshift in order to avoid this hysterisis frequent, unnecessary shifting of the clutch 96 and the brake 98 in the velocity range close to the threshold value.

In the selection of the gear ratio, the control arrangement also considers the pressure of the hydraulic fluid existing at the hydraulic motors 6, 68. If it exceeds an established threshold value, for example, during operation at an upward incline, then the control arrangement 40 automatically provides a transition from the second to the first gear ratio so that no limit values of the hydraulic motors 64, 68 are exceeded and the latter do not overheat excessively.

As already noted above, the second hydraulic motor 68 can be turned on and off by the second switch 128. It would also be conceivable to omit the second hydraulic motor 68 and the second switch 128.

The rotational speed of the internal combustion engine 38 is also provided as an input in the road or transport operating mode by the control arrangement 40 over the electronic control unit 104. It can be adjusted to a fixed value or a value provided, as input by the operator, within a range that as a rule is limited compared to the available rotational speed range, by means of the operating element 136 that is smaller than in the working operating mode in order to reduce the fuel consumption and the noise emission. It would also be conceivable to control the rotational speed of the internal combustion engine 38 as a function of its load that can be calculated by the control arrangement 40, for example, on the basis of the pressure sensor 114, 122 and the velocity sensors 110, 124 or determined on the basis of data stored in the electronic control unit 104.

FIG. 3 shows another embodiment of a transmission 66' that can be used in place of the transmission 66 of FIG. 2. The transmission 66' differs essentially only in the configuration of the planetary transmission 76' from the configuration according to FIG. 2, while the remaining elements are the same. The transmission 66' includes a gear 138 arranged on the input shaft 70 that meshes with a set of planets 140 which is arranged on a planet carrier 78. Furthermore, the planet carrier 78, which retains the planet set 140, is coupled with a disk 142 which can be brought into engagement with the brake 98 and that can be coupled with the input shaft 70 over the clutch 96. In addition, the planet carrier 78 is provided with a second set of planets 144, whose planets mesh with the sun gear 74, which is attached to the hollow shaft 80 which is used as an output drive. Each of the planets of the planet sets 140 and 144 are connected to each other so as to transmit torque.

If the brake 98 is applied by the actuator 118 and the clutch 96 is disengaged by the actuator 112, the planet carrier 78 is held stationary. The torque is transmitted over the input shaft 70, the gear 138, the planets of the planet set 140, the gears of the planet set 144, and the sun gear 74 to the hollow shaft 80, and from there further to the wheels 14, as described above. The planet carrier 78 remains stationary.

If the brake 98 is released and the clutch 96 is engaged, the torque is transmitted over the input shaft 70 over the clutch 96 to the planet carrier 78, from there over the second planet set 144 to the sun gear 74 and to the hollow shaft 80, and from there further to the wheels 14, as described above. In this case, the planetary transmission 76' is blocked in itself, while with the brake 98 applied and the clutch 96 engaged, the result is a gear reduction ratio. With this embodiment, the first gear ratio corresponds thereby to a brake 98 that is applied and a disengaged clutch 96, while the second gear ratio corresponds to a brake 98 that is released and a clutch 96 that is engaged. In this embodiment, the engagements of the clutch 96 and application of the brake 98 are also, in each case, delayed by a time interval in order to prevent a blocking of the transmission 66.

Having described the preferred embodiment, it will become apparent that various modifications can be made without departing from the scope of the invention as defined in the accompanying claims.

The invention claimed is:

1. In a self-propelled working machine a working operating mode and a transport operating mode and including a power source coupled over a transmission for driving ground engaging elements for propelling the machine over the ground, with the transmission including at least two selectable gear ratios, an actuator arrangement coupled to said transmission for selectively effecting said at least two gear ratios, and a control arrangement coupled to said actuator arrangement, the improvement comprising: said control arrangement includes an operating mode detector coupled to detect a direction of operation of said working machine and said working and transport operating modes and is responsive to a detected operating mode so as to effect a desired one of said gear ratios in response to the direction of operation of said working machine sensed by said mode detector.

2. The self-propelled working machine, as defined in claim 1, wherein said working machine has a mode selection element movable between first and second positions for selecting first and second modes of operation, and said mode detector being arranged to sense the position of said mode selection element.

3. The self-propelled working machine, as defined in claim 1, wherein said working machine has a working element movable between first and second operating positions respectively indicative of first and second modes of operation of said working machine; and said working mode detector sensing the operating position of said working element so as to sense said working mode of said working machine.

4. The self-propelled working machine, as defined in claim 1, wherein said transmission and control arrangement are so constructed and related to each other that said control arrangement operates so as to select a smaller number of gear ratios when said working machine is in said working operating mode than it does when said working machine is in said transport operating mode.

5. The self-propelled working machine, as defined in claim 1, wherein said control arrangement is operated so as to select only one of said at least two gear ratios in said working operating mode and/or during reverse operation.

6. The self-propelled working machine, as defined in claim 1, wherein said control arrangement is operated so as to select a gear ratio among all available gear ratios when said mode detector detects said transport operating mode.

7. The self-propelled working machine, as defined in claim 1, wherein said machine is a self-propelled forage harvester having working operating arrangements operable during the processing of crop materials; said working operating arrangements being coupled to said transmission by a drive coupling arrangement which is controllable for selectively disconnecting said working operating elements from being driven; and said control arrangement being operable for deactivating said working operating arrangements in response to said working machine being placed in said working transport mode.

8. In a self-propelled working machine including an internal combustion engine coupled over a transmission for driving ground engaging elements for propelling the machine over the ground, with the transmission including at least two selectable gear ratios, an actuator arrangement coupled to said transmission for selectively effecting said at least two gear ratios, and a control arrangement coupled to said actuator arrangement, said transmission further including an input shaft; a hydraulic pump coupled for being driven by said engine; a hydraulic motor coupled for receiving pressurized fluid from said pump and having an output shaft coupled to said input shaft of said transmission, the improvement comprising: said control arrangement being operative to cause said actuator arrangement to automatically select said gear ratios.

9. The self-propelled working machine, as defined in claim 8, wherein at least one of said pump and motor includes a swash plate mounted for being moved so as to effect displacement changes; and said control arrangement being coupled for controlling movement of said swash plate.

10. The self-propelled working machine, as defined in claim 9, an operating condition sensor coupled between said at least one of said pump and motor and said control arrangement for transmitting an operating data in the form of a signal to said control arrangement; and said control arrangement being responsive to said operating data for selecting a gear ratio as a function of said operating data.

11. The self-propelled working machine, as defined in claim 10 wherein said operating condition sensor is a working pressure sensor.

12. The self-propelled working machine, as defined in claim 8, wherein an electronic speed control is coupled to said internal combustion engine and to said control arrangement; and said control arrangement being operable to establish at said electronic speed control a signal representing a desired rotational speed of said internal combustion engine.

13. The self-propelled working machine, as defined in claim 12, wherein said control arrangement is operated in response to the operating mode sensed by said mode sensor so as to control the rotational speed of said internal combustion engine in accordance with whether said working machine is in a working operating mode or in a transport operating mode.

14. The self-propelled working machine, as defined in claim 13, wherein an engine load sensor is connected between said control arrangement and said internal combustion engine; and said control arrangement being operative, when said mode sensor is sensing a transport operating mode, so as to effect operation of said electronic engine speed control so as to either input a signal representative of a fixed rotational speed, or an input signal having a value depending on the load sensed by said engine load sensor.

15. In a self-propelled working machine including a power source coupled over a transmission for driving ground engaging elements for propelling the machine over the ground, with the transmission including at least two selectable gear ratios, an actuator arrangement coupled to said transmission for selectively effecting said at least two gear ratios, and a control arrangement coupled to said actuator arrangement, the improvement comprising: said control arrangement being operative to cause said actuator arrangement to automatically select said gear ratios and wherein a manually-operable, variable speed control element is coupled to said control arrangement for selectively sending a desired speed control signal to said control arrangement, whereby an operator may operate said manually-operable, variable speed control element so as to effect a desired forward propulsion velocity of said working machine.

16. The self-propelled working machine, as defined in claim 8, wherein gearing for establishing said at least two selectable gear ratios are located in said transmission in respective locations between said hydraulic motor and an output shaft arrangement coupled to said ground engaging elements; at least two shiftable elements being associated with said gearing for selectively establishing said at least two gear ratios in said transmission; and said at least two shiftable elements being selectively operable to establish said at least two gear ratios in said transmission while said working machine is operating.

17. The self-propelled working machine, as defined in claim 16, wherein said gearing of said transmission includes at least one planetary gear set including a sun gear and a planet carrier.

18. The self-propelled working machine, as defined in claim 17, wherein said at least two shiftable elements include a brake and a clutch that are operable for establishing a blocked condition in said planetary gear set which establishes a 1:1 gear ratio in said transmission.

19. The self-propelled working machine, as defined in claim 18, wherein said at least two shiftable elements are selectively operable to establish gear driving connections in said planetary gear set which result in a gear ratio other than a 1:1 ratio to be established in said transmission.

20. The self-propelled working machine, as defined in claim 4, wherein a manually-operable, variable speed control element is coupled to said control arrangement for selectively sending a desired speed control signal to said control arrangement, with said speed control element having an identical range of movement regardless of the operating mode of said working machine, and with said speed signal increasing as said speed control element is moved between extremes of its range, whereby the velocity range that can be selected when said working machine is in said transport operating mode is greater than that which can be selected when said working machine is in said working operating mode.

21. The self-propelled working machine, as defined in claim 9, wherein a load sensing element is located for sensing the load on said working machine and is coupled to said control arrangement for supplying a signal representative of said load; and said control arrangement being operative for controlling the displacement of said at least one of said pump and motor so as to control the speed of said working machine as a function of said load.

* * * * *